US007756227B2

(12) United States Patent
Gao et al.

(10) Patent No.: US 7,756,227 B2
(45) Date of Patent: Jul. 13, 2010

(54) METHOD AND APPARATUS FOR ADAPTIVE BEAMFORMING IN AN ANTENNA ARRAY SYSTEM FOR WIRELESS COMMUNICATIONS

(75) Inventors: Shiwei Gao, Nepean (CA); Hafedh Trigui, Ottawa (CA)

(73) Assignee: TenXc Wireless, Inc., Ottawa, Ontario (CA)

( * ) Notice: Subject to any disclaimer, the term of this patent is extended or adjusted under 35 U.S.C. 154(b) by 742 days.

(21) Appl. No.: 11/784,090

(22) Filed: Apr. 4, 2007

(65) Prior Publication Data

US 2007/0249404 A1 Oct. 25, 2007

(30) Foreign Application Priority Data

Apr. 4, 2006 (CA) .................................... 2547650

(51) Int. Cl.
*H04B 7/10* (2006.01)
(52) U.S. Cl. ........................ 375/347; 375/349
(58) Field of Classification Search ................ 375/347, 375/299, 349, 149
See application file for complete search history.

(56) References Cited

U.S. PATENT DOCUMENTS

2003/0185326 A1* 10/2003 Kolze .......................... 375/371
2010/0039325 A1* 2/2010 van Rooyen et al. ......... 342/377

* cited by examiner

*Primary Examiner*—Emmanuel Bayard
(74) *Attorney, Agent, or Firm*—Christopher & Weisberg, P.A.

(57) ABSTRACT

A novel system for performing adaptive beamforming in a slow frequency hopping environment is disclosed. The presence of slow frequency hopping means that conventional mechanisms of using beamforming weights from previous time slots are inapplicable. The inventive system calculates a series of beamforming weights from an estimate of the spatial location of the mobile subscriber in the previous frame, which is impervious to slow frequency hopping and the data that precedes the training sequence data of the current frame. The beamforming weights and the spatial location of the mobile are updated with the arrival of the entirety of the current frame. The initial beamforming weight estimate is sufficient to permit processing on a real-time basis of the current frame even if the inventive system is implemented as an appliqué system interposed between the antenna array and a conventional base station.

13 Claims, 4 Drawing Sheets

METHOD AND APPARATUS FOR ADAPTIVE BEAMFORMING IN AN ANTENNA ARRAY SYSTEM FOR WIRELESS COMMUNICATIONS

CROSS REFERENCE TO RELATED APPLICATIONS

This application claims the benefit of Canadian Application Serial No. 2,547,650, filed Apr. 4, 2006, which disclosure is incorporated herein by reference in its entirety.

FIELD OF THE INVENTION

The present invention relates to a method and apparatus for performing adaptive beamforming outside of a base transceiver station communications system for interference suppression and in particular to a method and apparatus for improving system performance in a slow frequency hopping environment.

BACKGROUND OF THE INVENTION

As cellular communications have developed, there have been an increasing number of users for each cell. This increased number of users has begun to strain the quality of the signals in those cells, as the increased number of users creates interference (sometimes referred to as co-channel interference) between the users.

Co-channel interference can be limited through the use of beamforming technology. Beamforming employs an antenna array with multiple antenna elements at a base transceiver station (BTS) wherein the signals received from the multiple antenna elements are dynamically weighted and combined, to enhance signals originating from desired mobile subscribers, while suppressing signals from unwanted mobile subscribers. An antenna array with such so-called adaptive beamforming capability is sometimes referred to as a smart antenna.

In a Time Division Multiple Access (TDMA) system such as the Global System for Mobile Communications (GSM), a known training sequence is inserted in each time slot to facilitate channel estimation, which may be used to assist in signal processing. It is also known that this training sequence may also be used to allow the base transceiver station to calculate the uplink beamforming weights, in order to optimize the signal strength for the desired users.

The majority of existing base transceiver stations do not have beamforming capability and operators are often hesitant to invest in an entirely new base transceiver station with enhanced capability. As such, beamforming systems are typically implemented on a cell-by-cell basis, preferably by introducing the advanced beamforming capability in a separate or appliqué structure that can be inserted in-line with the signal path without modification of the existing components.

When introducing an appliqué system to a base transceiver station, the amount of signal delay permitted to the appliqué system before entering the base transceiver station is constrained, which prevents store-and-forward type of processing where the received signals are temporarily stored until the training sequence has been received. Rather, conventional appliqué systems attempt to perform their processing in real-time. Thus, the beamforming weights are to be calculated, applied to the signals and the signals are combined and forwarded to the base transceiver station, all within the permissible time constraint.

If the co-channel interference is stationary in time, the weights obtained in the previous frame could conceivably be applied to the current frame of signals with little performance degradation, in order to satisfy this time constraint.

However, network administrators have increasingly adopted Slow Frequency Hopping (SFH) techniques to improve average channel quality for users by minimizing the likelihood that a user languishes in a channel with poor signal quality. Rather, the user is constantly moved to a different frequency. In a wireless system where slow frequency hopping (SFH) is used, the desired mobile may experience co-channel interference from different mobile subscribers in consecutive time frames due to the time-varying nature of the transmit frequency of each mobile subscriber. In this case, it is no longer appropriate to apply the beamforming weights from a previous frame to the data of the current frame, as the frequencies and thus potential interferers may well have changed in consecutive frames.

SUMMARY OF THE INVENTION

Accordingly it is desirable to provide an adaptive beamforming capability that may operate even in the presence of slow frequency-hopping systems.

It is further desirable to provide an adaptive beamforming capability that may be implemented without unduly delaying the data stream being processed.

It is further desirable to provide an adaptive beamforming capability that can be easily integrated into existing antenna systems.

It is still further desirable to provide an apparatus that enables transparent beamforming operations in an appliqué system without detailed link level information such as call setup or tear down.

In the present invention, a novel architecture is disclosed by which a spatial location of the desired signal is estimated using the training sequence (TSC) data of the previous frame, so that processing may commence without waiting for the training sequence (TSC) of the current frame. This information is then combined with the initial data bits of the current frame that arrive before the training sequence (TSC) to calculate appropriate beamforming weights.

In so doing, the calculation of the beamforming weights relies upon the spatial location of the mobile subscriber, which is relatively time-invariant, even in the presence of slow frequency hopping (SFH) technology. As such, this processing can be easily accommodated within the time constraints associated with an appliqué system.

The present invention relies on the observation that the spatial location of the desired signal will not move significantly between consecutive frames. The spatial location of the signal may thus be determined by calculation of a direction of arrival (DoA) metric.

In accordance with a first broad aspect of the present invention, there is disclosed a method of adaptively beamforming data for an antenna array, comprising the steps of: receiving in a current frame, an RF signal emanating from a mobile station; obtaining a spatial location associated with a previous frame of the signal; calculating beamforming weights based on pre-training sequence data of the current frame of the signal and the spatial location; applying the beamforming weights to the antenna array data to process the current frame; and estimating an updated spatial location associated with the current frame based on training sequence data of the current frame; and maintaining the updated spatial location for use with a future frame of the signal.

In accordance with a second broad aspect of the present invention, there is disclosed an adaptive beamforming system for a base station, comprising: a plurality of antenna elements for receiving in frames an RF signal emanating from a mobile station; a spatial location database for storing a spatial location associated with a previous frame of the signal; a beamforming weight calculator for determining a set of beam weights based on the stored spatial location; a beamforming network for applying the set of beam weights to retrieve a current frame of the signal; and a spatial location estimator for calculating a spatial location associated with the current frame for updating the spatial location database.

BRIEF DESCRIPTION OF THE DRAWINGS

The embodiments of the present invention will now be described by reference to the following figures, in which identical reference numerals in different figures indicate identical elements and in which.

DETAILED DESCRIPTION OF THE PREFERRED EMBODIMENTS

Figure 1:
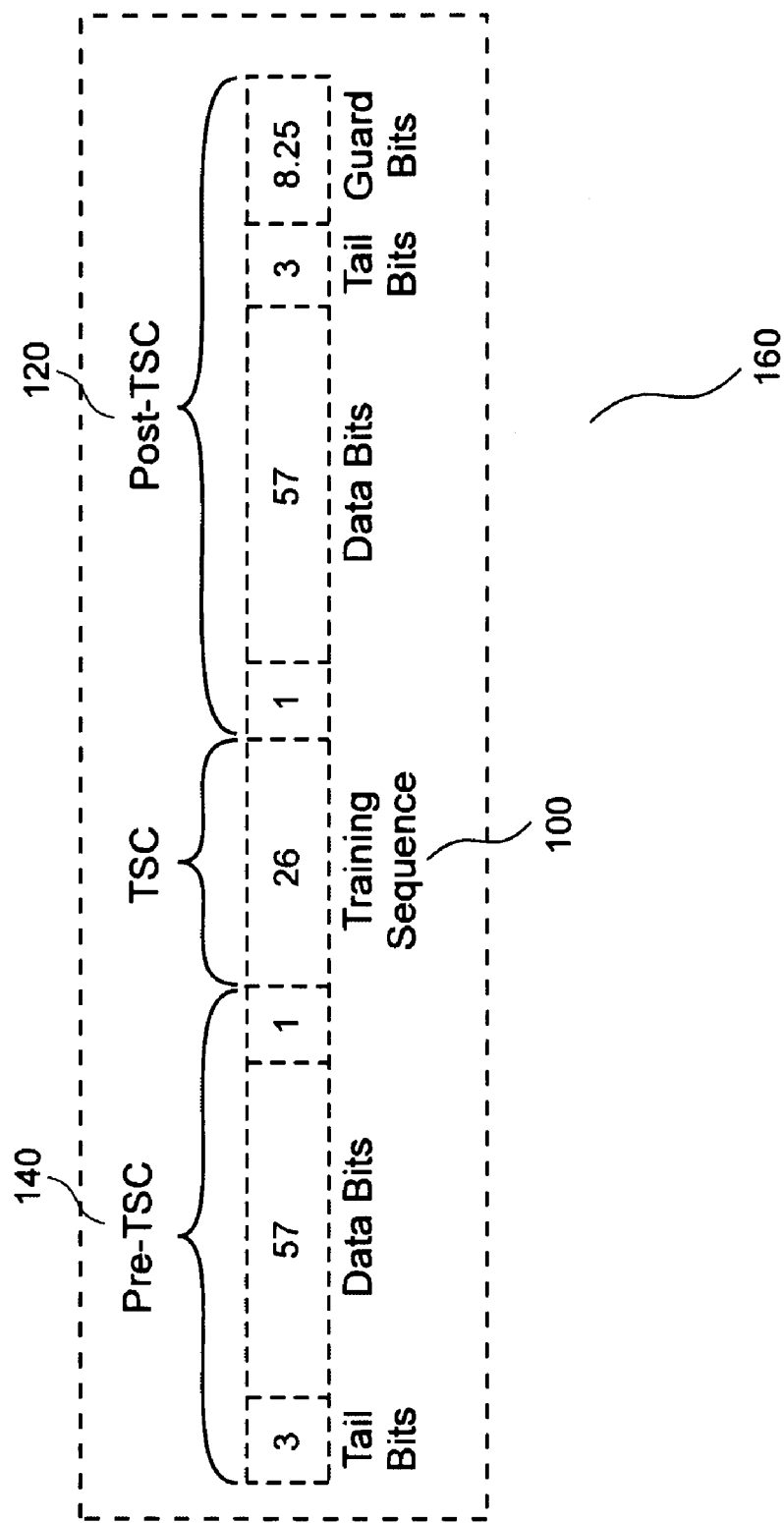
FIG. 1 is a diagram for exemplary purposes of the format defined for Global System for Mobile Communications (GSM) data frames.

FIG. 1 illustrates, for exemplary purposes only, the blocks of data that make up a frame for a Time Division Multiple Access (TDMA) system, as defined by the relevant communications standard, in particular, in a GSM system.

As can be seen, a known multi-symbol training sequence (TSC) 100 is inserted in the middle of every frame 160 for burst synchronization and channel estimation purposes, in both the uplink and downlink directions. There are eight variations of this training sequence 100 in the GSM standard and each cell in a cluster of adjoining cells is assigned one of these variations. Thus, with prudent assignment of the training sequence (TSC) 100 variations among adjoining cells, the training sequence (TSC) 100 may also serve as an indication of the cell from which the data frame emanates.

In the present invention, the training sequence (TSC) 100 is used, together with the spatial location of the desired signal, in the inventive system to perform adaptive beamforming even in the presence of Slow Frequency Hopping (SFH).

Over the course of communications between a mobile subscriber or station (not shown) and a base transceiver station 290 (FIG. 2), several data frames will typically be exchanged. Since a few of the recent data frames are typically kept in memory by the base transceiver station 290 for active mobile subscribers (not shown), the spatial location may be estimated using the training sequence (TSC) 100 data from the slot of the previous frame that is maintained in memory. As this information is available before the arrival of the current frame, the inventive system may begin calculating the beamforming weights from the data bits 110 of the current frame that arrive before the training sequence (TSC) 100, together with the spatial location estimate from the previous frame, and may apply the weights generated thereby as a rough estimate in order to process the incoming data stream so as to maximize signal strength from the desired mobile subscriber (not shown) and/or to minimize co-channel interference from users in other cells, until the training sequence (TSC) 100 has been received and processed. When the training sequence (TSC) 100 of the current frame is received, this initial rough estimate may then be firmed up and updated and applied to the data 120 following the training sequence (TSC) 100 and indeed initially to the data in the subsequent frame.

Figure 2:
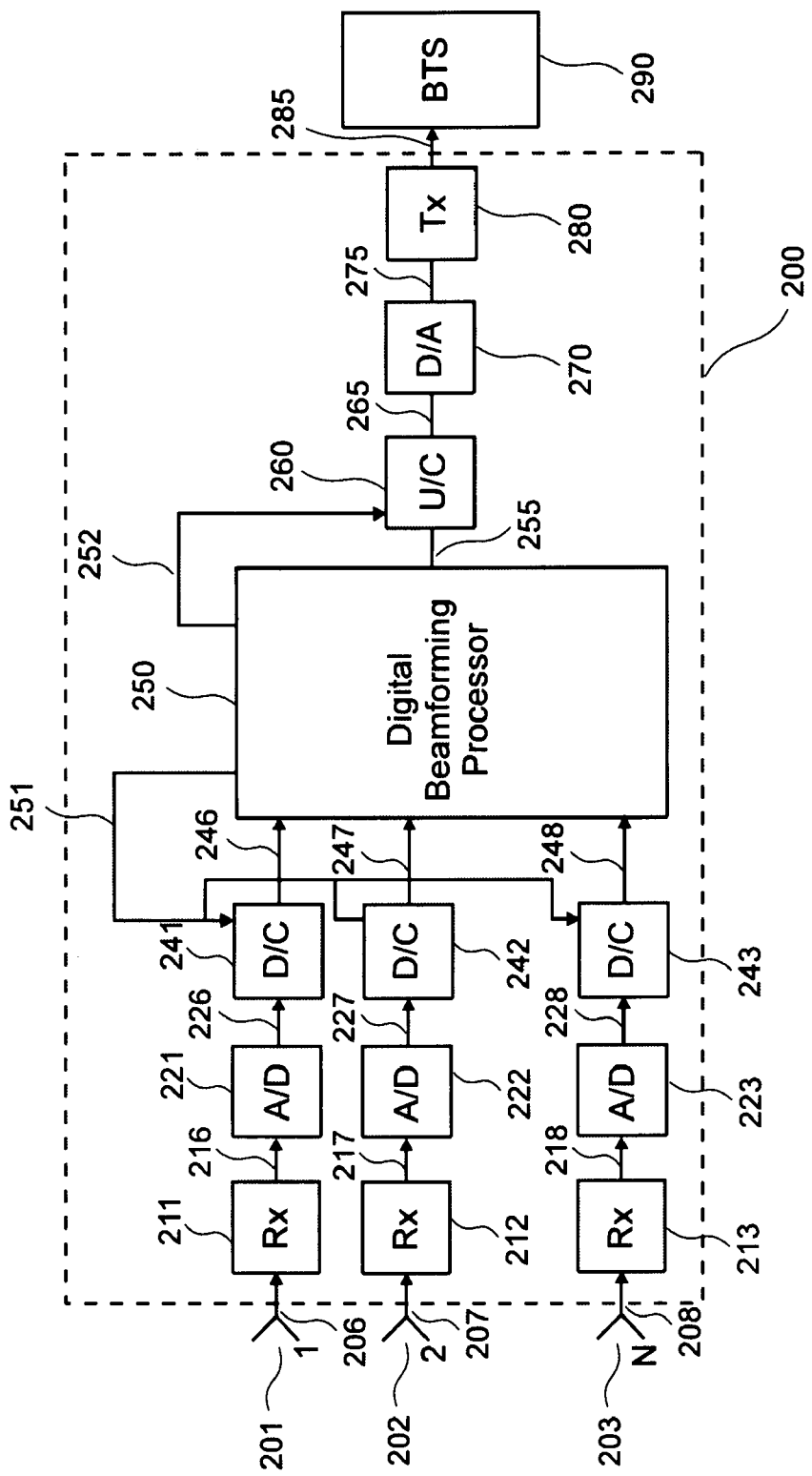
FIG. 2 is a block diagram of an exemplary embodiment of the present invention.

Turning now to FIG. 2, there is shown a block diagram of a receiver processor shown in dashed outline generally at 200 for use in conjunction with a base transceiver station (BTS) 290. The system 200 interconnects a plurality of N antenna elements 201-203 and the base transceiver station (BTS) 290. It comprises a plurality (one per antenna element or N) of RF receiver circuits 211-213, analog to digital (A/D) converters 221-223 and digital down-converters 241-243, a digital beamforming processor 250, a digital up-converter circuit 260, a digital to analog (D/A) converter 270 and a RF transmitter circuit 280.

Each antenna element 201-203 is connected to a corresponding RF receiver circuit 211-213, through one of a plurality of corresponding RF signal lines 206-208. The antenna elements 201-203 may collectively form a multi-element antenna array.

Each RF receiver circuit 211-213 is connected by its corresponding RF signal line 206-208 to its corresponding antenna 201-203 and by a corresponding analog signal line 216-218 to a corresponding analog to digital (A/D) converter 221-223.

Each RF receiver circuit 211-213 converts an RF signal received along its corresponding RF signal line 206-208 down from RF frequency by a fixed down-conversation factor to an intermediate frequency analog signal by baseband frequency synthesis and forwards it along its corresponding analog signal by baseband frequency synthesis line 216-218 to its analog to digital (A/D) converter 221-223.

Each analog to digital (A/D) converter 221-223 is connected by its corresponding analog signal line 216-218 to its corresponding RF receiver 211-213 and by a corresponding digital signal line 226-228 to a corresponding digital down-converter circuit 241-243. It converts the analog signal received along its corresponding analog signal line 216-218 into digital form and forwards it along corresponding digital signal line 226-228 to its corresponding digital down-converter circuit 241-243.

Each digital down-converter circuit 241-243 is connected by its corresponding selected signal line 226-228 to its corresponding analog to digital (A/D) converter 221-223 and by a corresponding baseband signal line 246-248 to and by a common first hopping frequency information control line 251 from the digital beamforming processor 250.

Each digital down-converter circuit 241-243 digitally down-converts the selected digital signal from an intermediate frequency, received along its corresponding selected signal line 226-228, to baseband based on hopping frequency information obtained from the digital beamforming processor 250 along the first hopping frequency information control line 251, filters the baseband signal to remove out-of-band interference, decimates the filtered signal at multiple times of the symbol rate and forwards it to the digital beamforming processor 250.

The digital beamforming processor 250 is connected to each digital down-converter circuit 241-243 by its corresponding baseband signal lines 246-248 and by first hopping frequency information control line 251, and to the digital up-converter circuit 260 by a beamformed signal line 255 and by a second hopping frequency information control line 252.

As discussed below in relation to FIG. 3, the digital beamforming processor 250 generates a spatial location estimate of a mobile user transmitting the signals received by the antenna elements 201-203. It uses this spatial location estimate in turn to calculate beamforming weights designed to optimally combine the antenna signals. It also maintains a database of the hopping frequencies, and their respective order and timing. Using this database, the digital beamforming processor 250 generates frequency hopping information control signals and forwards this information to each of the digital down-converter circuits 241-243 along the first hopping frequency information control line 251, and to the digital up-converter circuit 260 through the second hopping frequency information control line 252.

The digital up-converter circuit 260 is connected to the digital beamforming processor 250 by the beamformed signal line 255 and the second hopping frequency information control line 252 and to the digital to analog (D/A) converter 270 by an output digital signal line 265. The digital up-converter circuit 260 receives baseband data along the beamformed signal line 255, interpolates the signal at a sampling rate matched to the digital to analog (D/A) converter 270 and up-converts the interpolated baseband data to an intermediate frequency, based on hopping frequency information obtained from the digital beamforming processor 250 along the second hopping frequency information control line 252, forwarding the resulting output digital signal along output digital signal line 265.

The digital to analog (D/A) converter 270 is connected to the digital up-converter circuit 260 by digital signal line 265 and to the RF transmitter circuit 280 by an analog output signal line 275. It converts the output digital signal received from the digital up-converter circuit 260 into analog form and forwards the resulting output analog signal along output analog signal line 275.

The RF transmitter circuit 280 is connected to the digital to analog (D/A) converter 270 by output analog signal line 275 and to the base transceiver station (BTS) 290 by output RF signal line 285.

The RF transmitter circuit 280 amplifies, filters and up-converts the output analog signal received from the digital to analog (D/A) converter 270 by a fixed up-conversion factor to the desired RF frequency and forwards the resulting output RF signal along output RF signal line 285.

While the exemplary embodiment shown in FIG. 2 is of an appliqué system 200 that may be inserted in-line between the antennas 201-203 and with a conventional base transceiver station (BTS) 290, those having ordinary skill in this art will readily appreciate that the system 200 may be easily integrated in a new base transceiver station (BTS), for example, by eliminating the digital up-converter circuit 260, digital to analog (D/A) converter 270 and the RF transmitter circuit 280, as well as comparable RF receiver circuitry and analog to digital converter circuitry (not shown) at the front end of the base station 290. The elimination of such components would remove any time constraints for the processing described herein.

Figure 3:
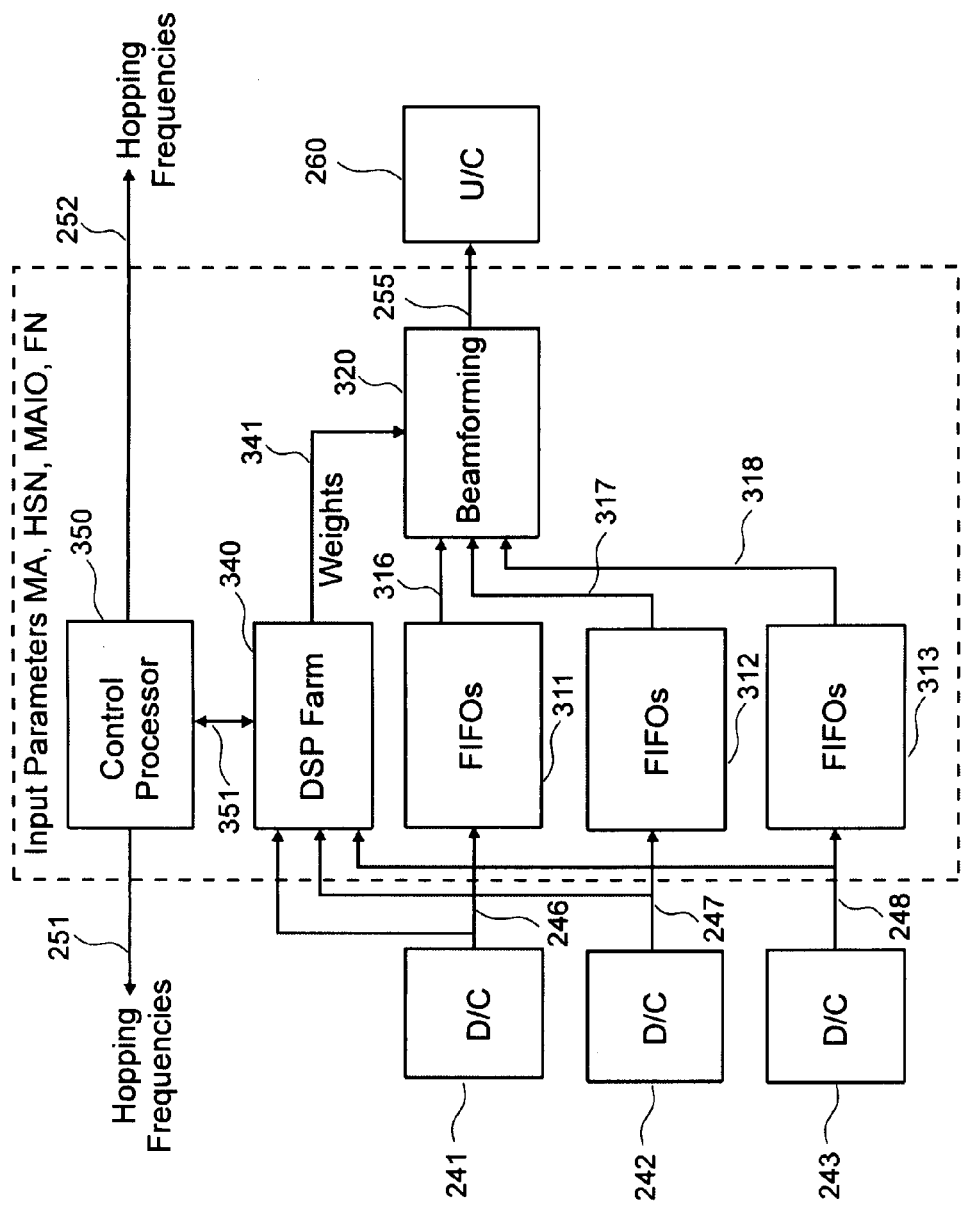
FIG. 3 is a block diagram of the digital beamforming processor in the embodiment of FIG. 2.

Turning now to FIG. 3, the digital beamforming processor 250 is shown in greater detail. In the figure, the digital beamforming processor 250 is shown in dashed outline. It comprises a plurality of first-in-first-out (FIFO) buffers 311-313, a beamforming circuit 320, a digital signal processing (DSP) farm 340, and a control processor 350.

Each FIFO buffer 311-313 is connected to a corresponding digital down-converter circuit 241-243 through a corresponding baseband signal line 246-248 and to the beamforming circuit 320 by a corresponding FIFO output signal line 316-318.

The FIFO buffers 311-313 each collect transmitted digital baseband signals along baseband signal lines 246-248 from each digital down-converter 241-243 and hold the signals in memory, while the same signal information is being processed in the DSP farm 340.

The beamforming circuit 320 is connected with each of the FIFO buffers 311-313 by its corresponding FIFO output signal line 316-318, with the DSP farm 340 by a beamforming weight signal 341 and with the digital up-converter circuit 260 through the beamformed signal line 255.

The beamforming circuit 320 collects the weights generated by the DSP farm 340 along the beamforming weight signal 241 and the collected signal data from the FIFO buffers 311-313 and applies the weights to the collected signal data, and combines them into a weighted signal that it forwards to the digital up-converter circuit 260 along beamformed signal line 255.

The DSP farm 340 is connected to each of the digital down-converter circuits 241-243 (and to the input of the corresponding FIFO buffer 311-313) by its corresponding baseband signal line 246-248, to the beamforming circuit 320 by the beamforming weight signal 341 and to the control processor 350 by bi-directional connection 351.

The DSP farm 340 collects the signals along the baseband signal lines 246-248 from each digital down-converter circuit 241-243, and calculates from them the appropriate beamforming weights, based on the known spatial location of the mobile subscriber (not shown) as calculated from the immediately previous frame, which it outputs to the beamforming circuit 320 along beamforming weight signal 341.

The control processor 350 is connected to each of the digital down-converter circuits 241-243 by the first hopping frequency information control line 251, to the digital up-converter circuit 260 by the second hopping frequency information control line 252 and to the DSP farm 340 by bi-directional connection 351.

The control processor 350 forwards updated hopping information to each of the digital down-converter circuits 241-243 and to the digital up-converter circuit 260 along the first hopping frequency information control line 251 and second hopping frequency information control line 252 respectively.

The control processor 350 also communicates information such as the mobile allocation number (MA), the hopping sequence number (HSN), the mobile allocation index offset (MAIO) and the frame number (FN) to the DSP farm 340 along bi-directional connection 351.

The control processor 350 tracks the mobile subscriber (not shown), the frame number and other information useful for assessing the identity and location of the mobile subscriber(s) (not shown), as well as the hopping frequencies in place for the current and previous frames. The control processor 350 maintains this in a spatial location table or database of data frames received from the various mobile subscribers (not shown) in the cell governed by the base transceiver station (BTS) 290. Furthermore, the control processor 350 knows the hopping frequency algorithm in use by the appropriate standard. In the exemplary embodiment, this is the GSM standard.

An example of a spatial location table, as maintained in the control processor 350 for the present invention, is shown in exemplary fashion in Table 1. Spatial location estimates of Direction of Arrival (DoA), denoted by $A_{ij}$, are calculated and updated in every frame. $A_{ij}$ is a complex vector of dimension N, where: N is the number of antenna elements, i is the RF carrier number as assigned to the mobile station when it enters communication with the base station, and j is the time slot number.

A validation bit is associated to each spatial location estimate $A_{ij}$ to indicate whether the estimate is valid, based on certain silent detection and burst synchronization tests to be described later. If the validation bit indicates an invalid spatial location, then a set of default weights is applied.

The spatial location table may also make provision for sub-channels in order to support the different operational standards of the GSM standard (such as half-rate operation), by maintaining separate entries for each sub-channel, as is discussed in detail in "3rd Generation Partnership Project; Technical Specification Group GSM/EDGE; Radio Access Network; Multiplexing and multiple access on the radio path (Release 1999) 3GPP TS 05.02 V8.11.0 (2003-06)".

Half-rate operation refers to an operational standard that permits the sharing of a time/frequency slot over a set of frames. A number of frames in a set may vary but is typically 26. The base transceiver station (BTS) 290 designates a time/frequency slot to be shared by a plurality of mobile subscribers, designates those mobile subscribers that will share the slot, and then assigns to each mobile subscriber a frame number at which each mobile subscriber will access the shared slot. A shared slot/frame number for assignment to a mobile subscriber is denoted a sub-channel.

Each mobile subscriber is thus assigned a sub-channel within the associated time/frequency slot. The sub-channels are then used by the base transceiver station (BTS) 290 to designate those frame numbers at which a given mobile subscriber may have access to the frame.

TABLE 1

Uplink Direction of Arrival (DoA) or Spatial Signatures of Desired Mobile Users

| Frame type | RF carrier # | Slot 0 DOA | Valid | Slot 1 DOA | Valid | ... | Slot 7 DOA | Valid |
|---|---|---|---|---|---|---|---|---|
| Subchannel 0 | 1 | A10 | | A11 | | | A17 | |
| Frames | 2 | A20 | | A21 | | | A27 | |
| | ... | | | | | | | |
| | n | An0 | | An1 | | | An7 | |
| Sub-channel 1 | 1 | A10' | | A11' | | | A17' | |
| Frames | 2 | A20' | | A21' | | | A27' | |
| | ... | | | | | | | |
| | n | An0' | | An1' | | | An7' | |

Referring to FIGS. 2 and 3, in operation, frame data from a mobile subscriber is received at (generally) each of the antennas 201-203 and processed by the plurality of corresponding RF receiver circuits 211-213, and analog to digital (A/D) converters 221-223 as described above, and down-converted by corresponding digital down-converter circuits 241-243 from the hopping frequency (as indicated by the first hopping frequency control signal 251) into a plurality of corresponding digital baseband signals, which they forward to corresponding FIFO buffers 311-313 and to the DSP farm 340. The FIFO buffers 311-313 store the signals in memory, while awaiting completion of processing of the same signals by the DSP farm 340.

The DSP farm 340 receives the digital baseband signals from each of the digital down-converter circuits 241-243 along corresponding baseband signal lines 246-248. The DSP farm 340 communicates the contents of the current data frame to the control processor 350 through bi-directional connection 351.

Because the spatial location information is updated as new information is provided during the reception process, the spatial location information will change as the mobile subscriber assigned to a particular sub-channel moves into different area. Also the spatial location information will change as new mobile subscribers enter the area serviced by the base transceiver station (BTS) 290 and old mobile subscribers leave.

An exemplary calculation process for deriving beamforming weights will now be described. The initial step is to determine the spatial location associated with the transmitting mobile subscriber.

Figure 4:
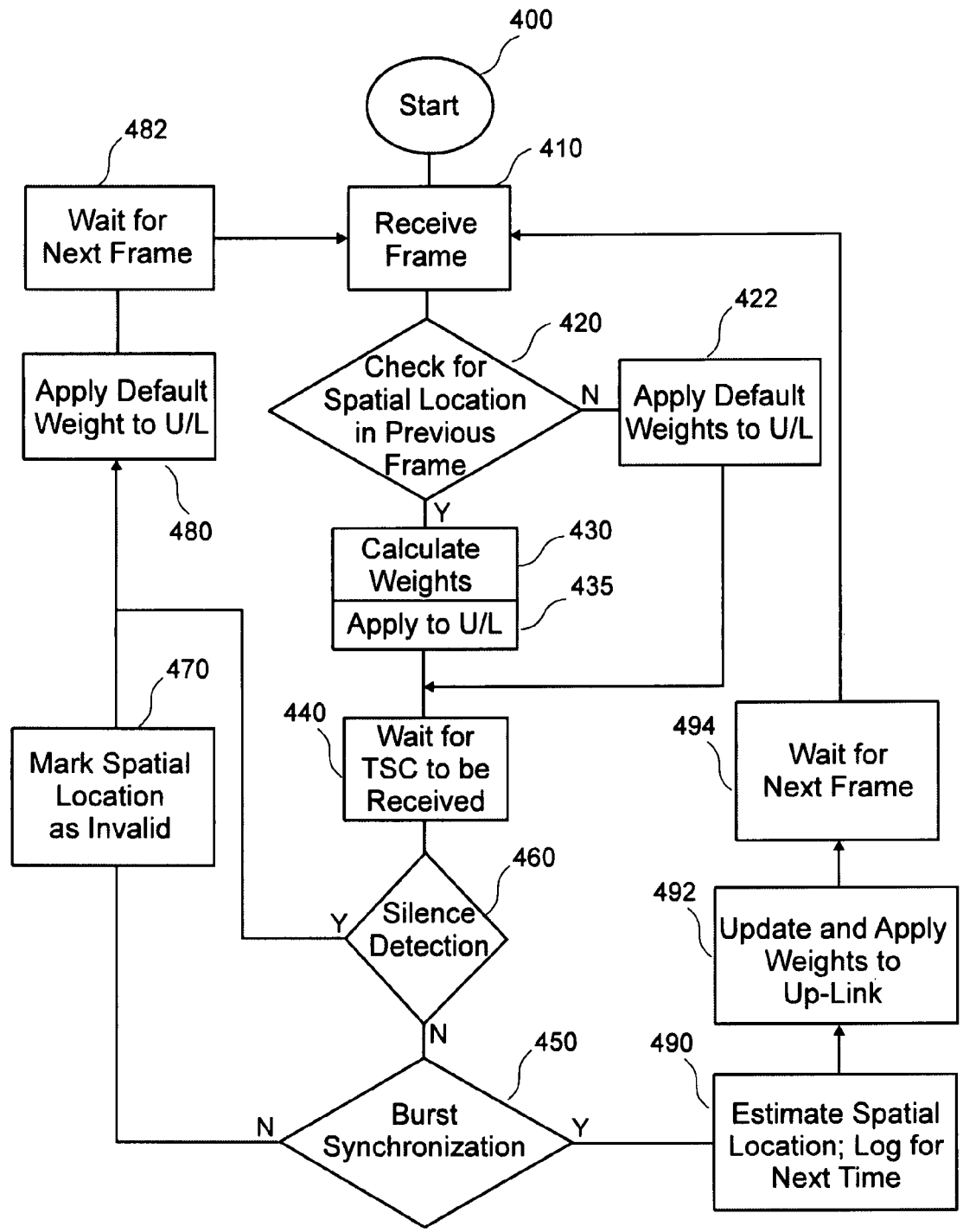
FIG. 4 is a flow chart showing steps taken in the processing carried out in the embodiment of FIG. 2.

Referring also to FIG. 4, in an exemplary embodiment the spatial location is estimated 490 by using a direction of arrival (DoA) metric. A suitable approach for direction of arrival (DoA) 490 estimation is to combine Capon's method and Wiener filtering using data from one or a plurality of frames. The antenna array is preferably calibrated for this approach in a manner known to those having ordinary skill in the art.

In Capon's method:

$$P(\theta) = \frac{1}{a^H(\theta) R^{-1} a(\theta)} \quad (1)$$

$$\text{where: } a(\theta) = \left[ 1, e^{-j2\pi \frac{d_2 - d_1}{\lambda} \sin(\theta)}, \ldots, e^{-j2\pi \frac{d_N - d_1}{\lambda} \sin(\theta)} \right]^T$$

for a linear antenna array of N antennas at locations from $d_1$ to $d_N$ and at signal wavelength $\lambda$, T denotes transpose, $\theta$ is the angle of arrival, and $R^{-1}$ is the inverse of the estimated covariance matrix R of the array signal in one frame defined as $$R = \frac{1}{N_s} \sum_{i=1}^{N_s} x(t_i) x^H(t_i),$$

where:

$x(t) = [x_1(t), x_2(t), \ldots, x_N(t)]^T$ are the signals received from the N antennas at time t, $N_s$ is the number of data samples used in the calculation for each time slot, and H denotes complex transpose.

The angles or directions $\theta$ associated with the peaks of $P(\theta)$ provide direction estimates of all the signals that have been detected in the antenna array.

Another manner to estimate direction of arrival (DoA) 490 would be to combine the Capon's method with an adaptive beamforming method as follows:

$$Q(\theta) = \sum_{i=1}^{L} P_i(\theta) \cdot G_i(\theta) \quad (2)$$

where $G_i(\theta) = |a^H(\theta) w_i|^2$, $w_i$ is the estimated weights in the $i^{th}$ frame, $O^H$ denotes complex transpose, $P_i(\theta)$ is the Capon's spectrum function obtained in the $i^{th}$ frame, calculated based on the received data in each, and L is the number of frames used for the estimation.

The direction of arrival $\theta$ associated with the maximum $Q(\theta)$ is then declared as the estimate of the direction of arrival (DoA) of the desired signal.

This approach should work well in a light-of-sight (LoS) environment but may not work as well in a heavy multi-path environment, such as a dense urban environment.

Yet another approach which can accommodate both situations is to estimate the spatial location 490 as a spatial signature, $a(\theta_s)$, which is a combination of all the multi-path components associated with the desired signal. This can be accomplished by using the training sequence (TSC) 100 in the GSM bursts:

$$a(\theta_s) \approx \frac{1}{N_{TSC}} \sum_{i=1}^{N_{TSC}} x(t_i) s^*(t_i) \quad (3)$$

where $N_{TSC}$ is the number of training symbols, $x(t_i)$ is the received array signal vector at the $i^{th}$ training symbol time, $s(t_i)$ is the $i^{th}$ training symbol, and ( )* indicates complex conjugate operation.

Since the multi-path channel may vary from one frequency to another, the spatial signature in every hopping frequency may be separately estimated and tracked for the purpose of weight calculation.

In an exemplary embodiment, the spatial location is estimated using the direction of arrival (DoA), which DoA estimation is performed at every burst after receiving the whole burst as follows:

First, the correlation matrix is calculated:

$$R_{xx} = \frac{1}{N_p} \sum_{i=1}^{N_p} x(t_i) x^H(t_i) \quad (4)$$

where: $N_p$ is the number of symbols used in each burst, including the tail bits. In the described embodiment, the maximum value for $N_p$ available in each burst for the calculation is 198.

Next, the Capon spectrum is determined:

$$P(\theta_i) = \frac{1}{a^H(\theta_i) R_{xx}^{-1} a(\theta_i)}; i = 1, 2, \ldots, M_a \quad (5)$$

where: $\{\theta_1, \theta_2, \ldots, \theta_{M_a}\} = \{-60, -59, \ldots, 59, 60\}$ in degrees.

The adaptive beamforming pattern may then be derived:

$$G(\theta_i) = |a^h(\theta_i) w(10)|^2; i = 1, 2, \ldots, M_a \quad (6)$$

where $w(10)$ is the beamforming weight vector described below in Equation (16).

Finally, the direction of arrival (DoA) may be identified:

$$\theta_s = \arg\left\{\underset{\theta}{\text{Max}}\{G(\theta_i) P(\theta_i), i = 1, 2, \ldots, M_a\}\right\} \quad (7)$$

After completing this spatial location estimate, however derived, the result is logged in the spatial location table, as shown in Table 1, or otherwise recorded for the next frame 490.

The control processor 350 updates the tracking information about the mobile subscriber in the spatial location table using the current frame information communicated by the DSP farm 340 along bi-directional connection 351, and returns the tracking information about the mobile subscriber from the previous frame to the DSP farm 340 through bi-directional connection 351.

The DSP farm 340 combines the current data frame information received along baseband signal lines 246-248 and the previous data frame information about the mobile subscriber, as communicated to it by the control processor 350 along bi-directional connection 351, to determine an initial estimate of the appropriate beamforming weights to apply to the current frame of signals from the mobile subscriber. The weights are then forwarded to the beamforming circuit 320 along beamforming weight signal 341.

The buffered data from the FIFO buffers 311-313 is sent in parallel to the beamforming circuit 320 along corresponding baseband signal lines 246-248. A common clock is used for all the analog to digital (A/D) converters 221-223 and the digital to analog (D/A) converters 270, so the signals from all the antennas are sampled synchronously.

The beamforming circuit 320 combines the beamforming weights received along the beamforming weight signal 341 from the DSP farm 340 and the signals received along the baseband signal lines 346-348 from the corresponding FIFO buffers 311-313. The resulting weighted composite signal is forwarded to the digital up-converter circuit 260 along beamformed signal line 255.

The digital up-converter circuit 260 receives the weighted combined signal from the beamforming circuit 320 along composite signal line 255, together with the governing hopping frequency from the control processor 350 along second hopping frequency information control line 252. The digital up-converter circuit 260 up-converts the composite weighted signal up to an intermediate frequency and forwards the resulting output digital signal along output digital signal line 265 to the digital to analog (D/A) converter 270.

The digital to analog (D/A) converter 270 converts the output digital signal received along output digital signal line 265 into analog form and forwards the resulting output analog signal along output analog signal line 275 to the RF transmitter circuit 280.

The RF transmitter circuit 280 converts the output analog signal received along output analog signal line 275 up to the hopping frequency by a fixed up-conversion factor and forwards the resulting output RF signal along output RF signal line 285 to the base transceiver station (BTS) 290.

With reference to FIG. 4 in conjunction with FIGS. 2 and 3, there is shown a flow chart showing processing steps performed by the digital beamforming processor 250, from a start point 400. The scenario postulates that the RF receiver circuits 211-213 according to the present invention begin to receive a frame 410 from the mobile subscriber. In this exemplary embodiment, the data received at the RF receiver circuits 211-213 is assumed to be in the prior art format shown in FIG. 1.

The control processor 350 then examines the spatial location table, as described previously, to determine if an active spatial location has been stored therein for the mobile subscriber from which the frame emanates. Such spatial location would have been determined from a previous frame transmitted by the mobile subscriber.

The information for each frame is stored in the spatial location table in a manner that associates a time and frequency slot with a direction of arrival (DoA) estimate (corresponding to a spatial location), along with an indication as to whether or not the estimate is valid.

After confirming the spatial location information from the previous frame 420 by comparing the mobile allocation (MA) numbers of the current and previous frames in the control processor 350 to confirm that they correspond to the mobile subscriber of interest, the DSP farm 340 dynamically calculates the initial set of beamforming weights 430, iteratively on a block-by-block basis in each time slot, which is the minimum time resource unit used in assigning to mobile users based on the spatial location estimation performed in previous frames. In the exemplary GSM embodiment, a time slot equals 156.25 symbols or about 577 μs.

The weights are thereafter updated with the new spatial location estimate, and applied to the up-link for the remainder of the burst 492. This weight update is done using the same approaches as described in step 430.

The weights for active time slots, that is, slots during which a signal is being transmitted, are calculated based on the following criteria:

$$\operatorname*{Min}_{w}[E|w^H x(t)|^2 + \sigma w^H w] \tag{8}$$

subject to:

$$w^H a(\theta_s) = 1 \tag{9}$$

$$w_{opt} = (R_{xx} + \sigma I)^{-1} a(\theta_s) / a^H(\theta_s)(R_{xx} + \sigma I)^{-1} a(\theta_s) \tag{10}$$

where:
- $\theta_s$ is the angle of arrival or direction of arrival of the desired mobile user with respect to the antenna array,
- $R_{xx}$ is the covariance matrix of the received data in the current frame,
- σ is the diagonal loading factor, a constant for robustness control,
- w is the weight to be calculated and used to combine the received signals, and
- I is the identity matrix.

The closed form solution is thus given by: $\theta_s$.

Note that the weight calculation in the current time slot does not depend on the training sequence (TSC) 100 portion of the signal. Thus it can be calculated on a symbol-by-symbol basis or using only a fraction of the symbols at the beginning of the burst before the training sequence (TSC) 100.

In order to calculate the weights for the active time slot 430, a correlation matrix estimation is made. In the exemplary embodiment, this is as follows:

$$R_{xx}(k) = R_{xx}(k-1) + \frac{1}{N_s} \sum_{i=1}^{N_s} x(t_{(k-1)N_s+i}) x^H(t_{(k-1)N_s+i}) \tag{11}$$

where:
- k indicates the $k^{th}$ data block in a burst,
- $R_{xx}(k-1)$ is the estimated correlation matrix for the $(k-1)^{th}$ data block,
- $R_{xx}(0) = 0$ is the null matrix,
- each $x(t_{(k-1)N_s+i})$ is the received signal at time $t_i$ from each antenna element,
- $N_s$ is the number of samples in a block,
- $N_a$ is the number of antennas, and T and H indicate transpose and complex transpose, respectively.

In the exemplary GSM embodiment, calculation of Equation (11) occurs over 144 symbols in every active burst starting from the third nominal tail bit 120 (FIG. 1). In this embodiment, $N_s=8$, meaning there are eight samples in a block, and that k will have values from 1 to 8.

The weighting calculation may now be performed:

For k=1 to 8, during which, in the exemplary GSM embodiment, the only information available for calculating the weights is the estimate of the direction of arrival of the mobile subscriber:

$$w(k) = [R_{xx}(k) + \sigma I]^{-1} a(\theta_s) \tag{12}$$

where:
- $w(k) = [w_1(k), w_2(k), \ldots, w_{N_a}(k)]^T$,
- I is the identity matrix,
- σ is a diagonal loading factor and is used to balance interference cancellation performance and signal degradations, and
- $a(\theta_s)$ is the estimated spatial location associated with the desired mobile in the previous frame(s) 420.

For k=9 to 10, corresponding, in the exemplary GSM embodiment, to that portion of the time slot that contains the training sequence (TSC) 100, in which the signal content is known, and the optimal weights may be calculated based on the training symbols, $R_{xx}(8)$ is reset to the null matrix:

$$R_{xx}(8) = 0 \tag{13}$$

Then the correlation matrix is calculated using Equation (11), and the spatial channel response is estimated:

$$d_k \approx d_{k-1} + \frac{1}{N_s} \sum_{i=1}^{N_s} x(t_{(k-1)N_s+i}) s^*(t_{(k-9)+i}); k = 9, 10 \tag{14}$$

where: $d_8 = 0$ (null vector), and
$\{s(t_1), s(t_2), \ldots s(t_{16})\}$ are the 16 centre symbols in the training sequence of 26 GSM training symbols for normal burst.

This enables the weight calculation:

$$w(k) = R_{xx}^{-1}(k) d_k \tag{15}$$

For k>10, corresponding to data slots after receipt of the training sequence (TSC) 100, the weights calculated for k−9, 10 may be appropriated:

$$w(k) = w(10) \tag{16}$$

The weights thus computed are applied 435 by the beamforming circuit 320 to the data of the current slot.

If there is no spatial location information corresponding to the current slot from previous frames, default weights are communicated 422 by the DSP farm 340 to the beamforming circuit 320 for application to the data of the current slot. In the exemplary embodiment, the default weights would correspond to an omni-directional beam pattern.

The digital beamforming processor 250 then waits for the training sequence (TSC) 100 data to be received 440. The status of the slot corresponding to this data may be determined by silence detection 450 in conjunction with burst synchronization detection 460 upon receipt of the training sequence (TSC) 100 data to confirm the reliability of the data obtained therefrom.

The silent time slot detection 460 test is performed by the DSP farm 340 to ensure that the current time slot is active and that the spatial location estimation is reliable. This test, known in the art, comprises comparing the received signal strength indicator (RSSI) of the present frame to a predetermined RSSI threshold value to establish whether or not the transmitting mobile subscriber is active.

There are a number of scenarios in which a received data frame may be silent, namely, when no desired signal is transmitted, no mobile subscriber has yet been assigned to a particular sub-channel, there is inactivity due to discontinuous transmission (DTX), and with particular reference to the exemplary GSM standard, the frame is an idle frame as defined by the GSM standard in full rate mode.

If silence is detected 460, this means that the mobile subscriber may not be active in the current time slot, and as such, the direction of arrival estimation may not be reliable. Default weights are thereafter applied to the up-link connection 480 in the beamforming circuit 320 for the current and subsequent frame of this sub-channel until silence is no longer detected, and the digital beamforming processor 250 moves to wait for the next frame 482.

If silence is not detected, then it is concluded that there is an active received signal burst. Burst synchronization 450 is thereafter performed to confirm that the burst is a normal GSM burst carrying user traffic data.

Burst synchronization detection 450 is also a well-defined test, known in the art, explained by the exemplary GSM standard and other communication standards. In these standards, known synchronization markers are embedded into the training sequence (TSC) 100 of normal frames 160. The control processor 350 monitors the training sequence (TSC) 100 of the data frame 160 received from the transmitting mobile subscriber, and looks for these synchronization markers. If the synchronization markers are found in their expected locations, then it is concluded that the burst is synchronized and a spatial location may be derived or updated therefrom.

Possible scenarios in which an active burst is not a desired normal burst include when the burst is an access burst used by the mobile at call start up to request set up of a call, the burst is from a different (GSM) mobile subscriber or the burst is the result of interference from neighbouring systems.

Burst synchronization detection 450 is done at every burst after receiving the data portion containing the centre 16 (as defined in the standard for the exemplary GSM embodiment) training symbols of the training sequence (TSC) 100. The known training symbols $\{s(t_1), s(t_2), \ldots s(t_{16})\}$ are correlated with the received data starting at the nominal training sequence boundary as follows:

$$R_{xs}^i(n) = \sum_{t=1}^{16} x_i(t-n)s(t); n = -1, 0 + 1; i = 1, \ldots, N_a \quad (17)$$

where: $x(1)$ to $x(16)$ correspond to the received data symbols at the nominal training sequence positions.

Note that the correlation window is only one symbol period long. This assumes that the mobile subscriber is synchronized to the base transceiver station (BTS) 290 with a maximum of one symbol error. Those having ordinary skill in this art will appreciate that the window size could conceivably be changed to different sizes.

The results of the correlations are then summed over all the antennas 201-203:

$$|R_{xs}(n)| = \frac{1}{N_a}\sum_{i=1}^{N_a} |R_{xs}^{(i)}(n)|, n = -1, 0 + 1. \quad (18)$$

and the maximum of $|R_{xx}(n)| (n=-1,0,+1)$, denoted as $R_{max}$, is then compared with the estimated average signal level in the slot.

Burst synchronization is declared successful if the following condition is satisfied $$\frac{R_{max}}{\frac{1}{N_a}\sum_{i=1}^{N_a} R_{xx}(i,i)} > \eta \quad (19)$$

where: $\eta$ is a predefined threshold.

Otherwise, the burst synchronization is said to have failed. If the test for burst synchronization fails, indicating that the active burst is not a normal burst, the spatial location is marked as invalid 470, default weights are applied to the active burst 480 for the current and subsequent frame and the digital beamforming processor 250 returns to await the next frame 482.

If the burst synchronization test is successful, then a new or updated spatial location is estimated 490 from the training sequence (TSC) 100 data, and logged in the spatial location table for the next frame. The beamforming weights are then updated based on the new spatial location information 492, and applied to the active burst by the beamforming circuit 320. Then the system waits for the next frame 494.

By following the process outlined above, the digital beamforming processor 250 continually examines and updates the spatial location of the desired signal and generates and updates the beamforming weights based thereon.

Accumulating the spatial location information into a database in the control processor 350 permits dynamic processing in the DSP farm 340 and updating of the beamforming weights in the beamforming circuit 320, to provide flexibility in the digital beamforming processor 250 to overcome any performance degradation that results from frequency hopping.

In this way, the system can process burst information dynamically, which in turns allows adaptive beamforming to be implemented without affecting the ability of the base transceiver station (BTS) 290 to use frequency hopping The present invention can be implemented in digital electronic circuitry, or in computer hardware, firmware, software, or in combination thereof. Apparatus of the invention can be implemented in a computer program product tangibly embodied in a machine-readable storage device for execution by a programmable processor; and actions can be performed by a programmable processor executing a program of instructions to perform functions of the invention by operating on input data and generating output. The invention can be implemented advantageously in one or more computer programs that are executable on a programmable system including at least one input device, and at least one output device. Each computer program can be implemented in a high-level procedural or object oriented programming language, or in assembly or machine language if desired; and in any case, the language can be a compiled or interpreted language.

Suitable processors include, by way of example, both general and specific microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of volatile and non-volatile memory, including by way of example semiconductor memory devices, such as EPROM, EEPROM, and flash memory devices; magnetic disks such as internal hard disks and removable disks; magneto-optical disks; CD-ROM disks; and buffer circuits such as latches and/or flip flops. Any of the foregoing can be supplemented by, or incorporated in ASICs (application-specific integrated circuits), FPGAs (field-programmable gate arrays) or DSPs (digital signal processors).

Examples of such types of computers are the DSP farm 340, the beamforming circuit 320 and the control processor 350 contained in the digital beamforming processor 150, suitable for implementing or performing the apparatus or methods of the invention. The system may comprise a processor, a random access memory, a hard drive controller, and an input/output controller coupled by a processor bus.

It will be apparent to those skilled in this art that various modifications and variations may be made to the embodiments disclosed herein, consistent with the present invention, without departing from the spirit and scope of the present invention.

Other embodiments consistent with the present invention will become apparent from consideration of the specification and the practice of the invention disclosed therein.

Accordingly, the specification and the embodiments are to be considered exemplary only, with a true scope and spirit of the invention being disclosed by the following claims.

The Embodiments of the present invention for which an exclusive property or privilege is claimed are:

1. A method of adaptively beamforming data for an antenna array, comprising the steps of:
   (a) receiving in a current frame, an RF signal emanating from a mobile station;
   (b) obtaining a spatial location associated with a previous frame of the signal;
   (c) calculating beamforming weights based on pre-training sequence data of the current frame of the signal and the spatial location;
   (d) applying the beamforming weights to the antenna array data to process the current frame; and
   (e) estimating an updated spatial location associated with the current frame based on training sequence data of the current frame; and
   (f) maintaining the updated spatial location for use with a future frame of the signal.

2. A method according to claim 1, comprising the step of:
   (g) applying the beamforming weights to the antenna array data for receipt by the base station.

3. A method according to claim 1, wherein the step of estimating is calculating a direction of arrival (DoA).

4. A method according to claim 3, wherein the step of calculating a direction of arrival (DoA) comprises using Capon's method.

5. A method according to claim 3, wherein the step of calculating a direction of arrival (DoA) comprises combining Capon's method with adaptive beamforming.

6. A method according to claim 1, further comprising, after step (e), of the step:
   (e1) validating the beamforming weights calculation of step (c) using the training sequence data of the current frame.

7. A method according to claim 6, wherein the step of validating comprises detecting silence.

8. A method according to claim 7, wherein the step of detecting silence comprises comparing a received signal strength indicator (RSSI) against a pre-determined threshold.

9. A method according to claim 7, wherein the step of detecting silence comprises comparing a ratio of a magnitude of a correlation peak to a received signal strength indicator (RSSI) measurement against a predetermined threshold.

10. A method according to claim 6, wherein the step of validating comprises detecting burst synchronization.

11. A method according to claim 1, wherein the step of estimating comprises calculating a spatial signature of the signal emanating from the mobile station.

12. A method according to claim 1, further comprising, after step (e) of the step:
    (e2) recalculating beamforming weights based on the training sequence of the current frame of the signal.

13. An adaptive beamforming system for a base station, comprising:
    a plurality of antenna elements for receiving in frames an RF signal emanating from a mobile station;
    a spatial location database for storing a spatial location associated with a previous frame of the signal;
    a beamforming weight calculator for determining a set of beam weights based on the stored spatial location;
    a beamforming network for applying the set of beam weights to retrieve a current frame of the signal; and
    a spatial location estimator for calculating a spatial location associated with the current frame for updating the spatial location database.

* * * * *